United States Patent [19]
Andrascheck et al.

[11] 4,071,490
[45] Jan. 31, 1978

[54] PLASTICS FOIL FOR THE MANUFACTURE OF AUDIO-VISUAL INFORMATION CARRIERS

[75] Inventors: Hans-Joachim Andrascheck; Rainer Mücke; Werner Lorz, all of Burgkirchen (Alz); Heinz Borchard; Jürgen Buck, both of Nortorf; Herbert Knothe, Neumunster; Bruno Rybka, Nortorf, all of Germany

[73] Assignee: Hoechst Aktiengesellschaft, Frankfurt am Main, Germany

[21] Appl. No.: 721,308

[22] Filed: Sept. 8, 1976

[30] Foreign Application Priority Data

Sept. 12, 1975  Germany .............................. 2540654

[51] Int. Cl.$^2$ ............................................. C08L 91/00
[52] U.S. Cl. .......................... 260/23 XA; 260/28.5 D; 260/45.7 R; 260/45.75 J; 260/45.75 W; 260/890; 260/891; 260/897 C; 260/899; 526/317; 526/321; 526/330; 526/344

[58] Field of Search ...... 260/28.5 D, 23 XA, 45.75 J, 260/45.7 R, 45.75 W, 890, 876 R, 891, 897 C, 899; 526/344, 330, 317, 321

[56]  References Cited
U.S. PATENT DOCUMENTS

| 3,922,320 | 11/1975 | Love | 260/876 R |
| 3,923,765 | 12/1975 | Goetze et al. | 260/78.5 R |
| 3,960,790 | 6/1976 | Khanna | 260/28.5 D |

Primary Examiner—Melvyn I. Marquis
Attorney, Agent, or Firm—Connolly and Hutz

[57] ABSTRACT

A rigid polyvinyl chloride foil with modified impact resistance and free from plasticizer especially suitable for the manufacture of audio-visual information carriers with stamped spiral grooves from which the information is played back by pressure scanning. The foil is characterized by a special combination of properties such as flow, reduction in length, toughness, surface resistance, elasticity, peak-to-valley height and surface deposit.

3 Claims, No Drawings

PLASTICS FOIL FOR THE MANUFACTURE OF AUDIO-VISUAL INFORMATION CARRIERS

This invention relates to a rigid polyvinyl chloride foil with modified impact resistance and free from plasticizer for the manufacture of audio-visual information carriers with stamped in spiral grooves from which the information can be played back by a pressure scanner.

German Offenlegungsschrift DOS No. 1,929,396 and especially German Offenlegungsschrift DOS No. 2,164,678 relate to the manufacture of audio-visual information carriers (television storage disk) from plastics foils by stamping the information in the foil in the heat and under pressure in the form of spiral grooves (vertical recording in grooves).

According to German Offenlegungsschrift DOS No. 2,029,931 rigid foils of emulsion polyvinyl chloride (E-PVC) are used for making television storage disks. The proposed foils do have some of the properties required for the intended use, but they also have serious disadvantages. It has been found that foils of E-PVC are covered on their surface with substances causing the formation of a deposit on the stamping matrix on which the information is stamped into the foil, so that the relief pattern is falsified. It has also been found that the deposit on the foil is abraded by the scanner of the reproducing device when the information is played back. In this manner the scanner is soiled whereby the wanted signal is diminished and the quality of picture and sound is affected.

The reproduction system of stored information (signals) recorded in plastics foils is described in German Offenlegungsschrift No. 1,574,489.

An unobjectionable stamping of the signals with a high groove density and an accurate play-back of the recorded signals is only ensured with a plastics foil having a combination of several specific properties.

Hence, it is an essential prerequisite that the surface of the foil is smooth, i.e. substantially free from any structure. This requirement is satisfactorily fulfilled with a foil surface having an average peak-to-valley height of less than 0.4 $\mu$m measured on a Perth-O-Meter. Still further, the foil should have special flow properties and a minor tendency to shrinking so that in the stamping of the grooves under the action of pressure and heat the relief of the matrix is reproduced as accurately and as sharply as possible without a noteworthy stress being built up in the foil, which would impair the thrust accuracy and rotational accuracy of the spiral grooves when the recorded signals are played back. On the other hand, the foil should have a sufficient toughness so that it will not be damaged in the stamping process and a possibly necessary punching out of the disk.

It is known that foils to be used for the manufacture of television storage disks should have a relatively low surface resistance in order to avoid as far as possible soiling of the surface by the attraction of dust due to electrostatic charge, which soiling would have a highly detrimental effect, especially with respect to the stamping. The necessary antistatic finishing of the foil is a problem which is not very easy to solve as it should not only ensure a lasting effect but also prevent the antistatic agent from concentrating on the surface. Moreover, by stamping under heat the anti-electrostatic effect of the foil should not be lost completely in view of the fact that the surface of the television storage disk should also have an antistatic effect. Incorporated anti-electrostatic additives — a permanent effect being obtained exclusively with those — are only effective, however, when at least a small amount thereof remains on the surface of the article. It can be gathered from the foregoing statements that foils which are used for making television storage disks should not have on their surface larger amounts of deposits of any type as they would cause not only the formation of undesired incrustations on the stamping matrix but also diminish the quality of picture and sound reproduction as a result of soilings on the scanner.

When the signals stored on the foil are reproduced by means of the pressure scanning system described in German Offenlegungsschrift No. 1,574,489 the elastic modulus of the foils used is also of importance. In this scanning system the scanner is substantially rigid as to shape and the distance of its surface of contact from the carrier surface, imagined as being unstamped, is constant, while the elasticity resulting from the scanning at a high scanning speed is essentially located in the carrier surface. The elastic change of shape of the carrier surface caused by the compressive force should be substantially greater than the deflection in opposite direction, resulting from the compression, of the surface of contact of the scanner and the change in shape of the carrier surface at the intended scanning speed should essentially remain within the elastic range of the carrier material.

A plastics foil combining the aforesaid special physical properties has not yet become known.

It is, therefore, the object of the present invention to provide a plastics foil combining these properties within defined limits which comply to a sufficient extent with the multiple demands on foils for the manufacture of audiovisual information carriers.

The rigid polyvinyl chloride foil in accordance with the invention is free from plasticizer and has a modified impact resistance. It is suitable for the manufacture of audio-visual information carriers with stamped in spiral grooves carrying the information. The polyvinyl chloride foil of the invention is characterized by the following properties:

a. a flow corresponding to a melt viscosity in the range of from 20 to 72 g/10 minutes,
b. a reduction in length of at most 20% at 160° C,
c. a toughness corresponding to a factor of at least (25 % . mm$^2$)/newtons in longitudinal and transverse direction,
d. a surface resistance of at most 10$^{10}$ ohms,
e. an elasticity corresponding to an elastic modulus in the range of from 2,500 to 5,000 newtons/mm$^2$,
f. a peak-to-valley height corresponding to a Perth-O-Meter value of less than 0.4 $\mu$m, and
g. a surface deposit corresponding to a foil extraction residue of less than 0.012% by weight.

A foil having this special combination of properties is especially suitable for the manufacture of sound and picture information carriers.

The foil according to the invention preferably has a flow corresponding to a melt viscosity in the range of from 35 to 55 g/minute and an elasticity corresponding to an elastic modulus of from 2,700 to 3,200 newtons/mm$^2$.

For the manufacture of the foils according to the invention there are used vinyl chloride homopolymers or copolymers having a content of comonomers of at most 10% by weight, calculated on the total polymer, produced by the known continuous or discontinuous polymerization processes, or mixtures of the said polymers. In the polymers the proportion of polymerization auxiliaries, such as suspension auxiliaries and emulsifiers, should not exceed 2.5% by weight, preferably 2.0% by weight. Polymers generally designated emulsion polyvinyl chloride containing much more than 2.5% by weight, calculated on the polymer, of emulsifiers are not suitable, but the special E-PVC types which differ from the usual types by an emulsifier content of less than 2.5% by weight, preferably less than 2.0% by weight, calculated on the polymer. Polymers of this type can be produced under definite polymerization conditions (seed technique).

Suitable comonomers are vinyl esters of linear or branched carboxylic acids having preferably from 2 to 4 carbon atoms, such as vinyl acetate, propionate, or butyrate; vinyl ethers; unsaturated acids such as maleic, fumaric, acrylic, methacrylic acid and the mono- or diesters thereof with mono- or dialcohols having from 1 to 10 carbon atoms and cyclohexyl maleic imide. The vinyl chloride polymers to be used have a K value (DIN 53 726) of from 55 to 65, preferably 57 to 60.

Suitable agents to modify the impact strength of the vinyl chloride polymers are the known synthetic polymers, preferably acrylonitrile-butadiene-styrene (ABS) resins, methylmethacrylate-acrylonitrile-butadiene-styrene (MABS) resins, methylmethacrylate-butadiene-styrene (MBS) resins, polymethyl methacrylate, chlorinated low pressure polyethylene having a chlorine content of 30 to 40% by weight, or ethylene-vinyl acetate copolymers as well as mixtures of the said polymers. The amount of said polymers should be chosen to obtain a foil having the desired toughness. In general 8 to 15 % by weight will be added, calculated on the total mixture. Especially suitable ABS, MABS and MBS resins have a butadiene content of at least about 30% by weight, at most about 60% by weight.

The polymers used are stabilized with the chemical compounds known for this purpose, for example organo-tin-sulfur compounds, urea and thiourea derivatives, salts of alkaline earth metals and of zinc with aliphatic carboxylic acids or oxycarboxylic acids, and substances having a similar effect. The stabilizers are used in an amount of from 0.2 to 3% by weight, preferably 0.8 to 1.2% by weight, calculated on the total mixture, either singly or in the form of a mixture of any two or more of the said compounds, or in admixture with costabilizers and antioxidants.

Suitable lubricants are the known compounds, for example one or several high molecular weight aliphatic carboxylic acids and oxycarboxylic acids and the esters and amides thereof, for example stearic acid, montanic acid, bis-stearyl-ethylene diamine, montanic acid esters of ethanediol or butanediol-1,3, which are optionally saponified partially, fatty alcohols having more than 10 carbon atoms and the ethers thereof; low molecular weight polyolefins and hard paraffins in an amount of from 0.1 to 4 % by weight, preferably 0.5 to 1.5 % by weight, calculated on the total mixture.

As already stated above, the antistatic finishing of a foil for the manufacture of television storage disks constitutes a special problem. It has been found that a mixture of a quarternary ammonium salt and a hydroxyl group containing ester of a polyhydric alcohol having from 2 to 6 carbon atoms with a fatty acid having from 9 to 20 carbon atoms, preferably of glycerol or sorbitol with a fatty acid having 12 to 18 carbon atoms, especially an olefinic fatty acid of the $C_{18}$ series constitutes an antistatic agent which complies with the demands.

Suitable quaternary ammonium salts are preferably those of the formula

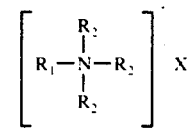

in which $R_1$, $R_2$ and X may represent the following radicals:

$R_1$ = an aliphatic, saturated or unsaturated alkyl radical having from 9 to 19 carbon atoms, especially an aliphatic saturated radical having from 12 to 18 carbon atoms; $-(CH_2)_n$-O-alkyl with n being in the range of from 1 to 5; $-CH_2-CH(OH)-CH_2-$O-alkyl or

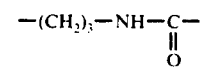

alkyl, in the latter formulae alkyl meaning an aliphatic, saturated or unsaturated radical having from 9 to 19 carbon atoms;

$R_2$ = $-CH_3$, $-CH_2-CH_2-OH$, $-CH_2-CH_2-CH_2OH$,

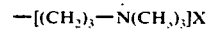

or H;
and

X = $-Cl, -ClO_4, -NO_3,$ or $-SO_4CH_3$.

Especially suitable hydroxyl group containing esters are glycerol monooleate, glycerol monoricinoleate, glycerol monococoate, diglycerol monooleate, diglycerol monococoate, and sorbitan monolaurate. The mixture of the two components is used in an amount of from 1 to 4% by weight, preferably 1.5 to 2.5% by weight, calculated on the total mixture, the ratio of quaternary ammonium salt to ester in the mixture being in the range of from 1 : 1 to 1 : 4, preferably 1 : 2.

The foil may contain dyestuffs and/or pigments, but it is indispensible that these substances do not detrimentally affect the characteristic properties of the foil. An especially suitable pigment is carbon black, which is used in an amount of from 0.1 to 1 % by weight, calculated on the total mixture.

To manufacture the foil according to the invention the vinyl chloride polymer and the aforesaid processing auxiliaries are thoroughly mixed in a usual mixer, for example a rapid mixer, and then processed into foils having a thickness of from 60 to 250 μm, preferably 90 to 150 μm. The polymer composition is first subjected to a preliminary gelling, for example in a kneader or a plurality of rolls, then preferably calendered on a four or five roll calender according to the high temperature process at roller temperatures of from about 190° to about 210° C and the foil is cooled by cooling rolls after having left the last calender roll.

The physical properties of the foils according to the invention are measured by the following methods. Prior to measuring properties 3, 4, and 5 the samples were pretreated for one day at normal climatic conditions 23/50 according to DIN 50 014, i.e. 23° C ± 2° C and relative humidity 50% ± 5%.

1. Flow:

As measure of the flow the melt viscosity (melt index) according to DIN 53 735 is determined.

2. Reduction in length (shrinkage):

A piece of foil having a size of 10 × 10 cm is kept for 15 minutes in a drying cabinet at 160° C, whereafter the reduction in length is measured and expressed in %.

3. Toughness:

The toughness (toughness factor $Z_1$) is measured according to the method described in "Kunststoffe" 62 (1972), no. 8, pages 505 to 511.

4. Surface resistance:

The surface resistance ($R_{OA}$) is measured according to DIN 53 482 with a Digital-Tera-Ohmmeter of Messrs. Kamphausen at a measuring voltage of 100 volts.

5. Elastic modulus:

The elastic modulus is measured according to the tensile test described in DIN 53 457.

6. Peak-to-valley height:

On a sample a surface area of 3 × 25 mm is scanned with the Perth-O-Meter with scanning arm T 25. The surface roughness is recorded with the following settings of the meter:

enlargement: horizontal 500 μm/cm, vertical 0.5 μm/cm, wave filter Rt 0.075, connection A1, B2, C10.

7. Surface deposit:

To determine the surface deposit a piece of foil of 1 square meter is cut into decimeter pieces and the total weight of the pieces is determined. With a pair of tweezers the pieces are immersed in 150 cc of a 1 : 1 methanol-water mixture having a temperature of about 20° C in a 2 liter beaker and the whole is shaken for 30 seconds. After having taken out the pieces, they are washed with very small amounts of the same methanol-water mixture. The entire methanol-water mixture is then concentrated. When the mixture is concentrated to a few milliliters it is transferred into a pre-dried porcelain dish, evaporated to dryness, cooled in desiccator and weighed.

The following examples illustrate the invention, the parts being by weight unless otherwise stated.

EXAMPLE 1

In a rapid mixer a homogeneous mixture was prepared from 86.0 parts of vinyl chloride homopolymer prepared by mass polymerization, K value 57, 10.0 parts of MABS resin of the following composition in % by weight 19.0% of methylmethacrylate 2.5% of acrylonitrile 45.0% of butadiene 33.0% of styrene 0.4 part of butanediol-1,3 montanic acid ester treated with lime to an extent such that about 40% of the originally used montanic acid was present in the form of the calcium salt 1.15 parts of di-n-octyltin bis (2-ethylhexyl-thioglycolate)

0.8 part of quaternary ammonium salt (in the form of a 50% solution) of the formula

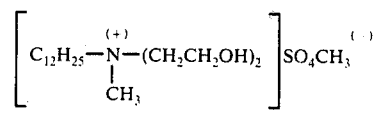

1.35 parts of glycerol monococoate, 0.3 part of carbon black.

The homogeneous mixture was gelled in a kneader at a temperature of approximately 140° C and calendered on a four roll L type calender, the rolls of which were heated in the running direction of the foil to 190°, 195°, 200° C and 210° C, to obtain a foil having a thickness of 120 μm.

EXAMPLE 2

A foil was prepared as described in Example 1 from 86.3 parts of vinyl chloride homopolymer prepared by suspension polymerization, K value 60, 10.0 parts of MBS resin of the following composition in % by weight.

32% of methylmethacrylate

32% of butadiene

36% of styrene 0.4 part of montanic acid ester as in Example 1, 1.15 parts of di-n-octyltin bis (2-ethylhexyl-thioglycolate)

0.5 part of quaternary ammonium salt of the formula

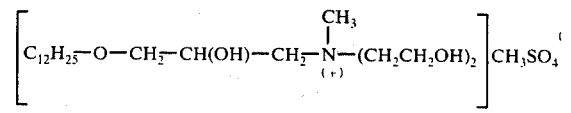

1.35 parts of glycerol monoricinoleate 0.3 part of carbon black.

EXAMPLE 3

Under the conditions of Example 1 a foil was prepared from 86.3 parts of vinyl chloride homopolymer prepared by mass polymerization, K value 57, 10.0 parts of MABS resin of the composition specified in Example 1, 0.4 part of montanic acid ester as defined in Example 1

1.5 parts of di-n-butyltin bis (2-ethylhexyl-thioglycolate), 0.5 part of the compound of formula

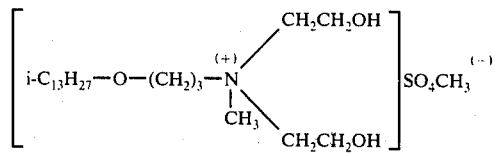

1.0 part of sorbitan monolaurate (commercial product, available for example under the name of Span 20 ® of Messrs. Atlas-Chemie, Essen, Federal Republic of Germany)

0.3 part of aniline dye.

The foil had a thickness of 160 μm.

EXAMPLE 4

A foil having a thickness of 200 μm was prepared under the conditions of Example 1 from 86.6 parts of vinyl chloride homopolymer prepared by suspension polymerization, K value 57,
10.0 parts of ABS resin composed of
 18% of acrylonitrile
 50% of butadiene
 32% of styrene
0.4 part of di-n-butyltin bis (2-ethylhexyl-thioglycolate)
0.5 part of the compound of the formula

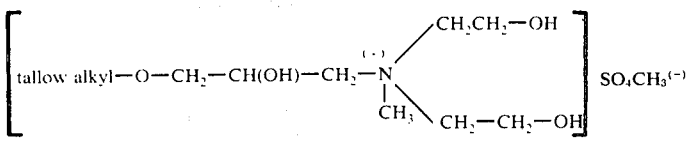

(tallow alkyl having the following typical chain distribution $C_{14}:C_{16}:C_{18}$ in a proportion of 5 : 25 : 65 with 50% of $C_{18}$ being oleyl)
0.2 part of montanic acid ester as used in Example 1,
1.0 part of amide wax (bisstearoyl ethylene diamine)
1.0 part of sorbitan monolaurate,
0.3 part of carbon black.

EXAMPLE 5

A foil having a thickness of 100 μm was prepared as described in Example 1 from:

85.5 parts of vinyl chloride homopolymer prepared by mass polymerization, K value 60,
10.0 parts of MBS resin composed of
 33% of methylmethacrylate
 36% of butadiene
 31% of styrene
0.3 part of montanic acid ester as used in Example 1,
1.0 part of amide wax
1.5 parts of di-n-butyltin bis (2-ethylhexyl-thioglycolate)
0.7 part of the compound of the formula

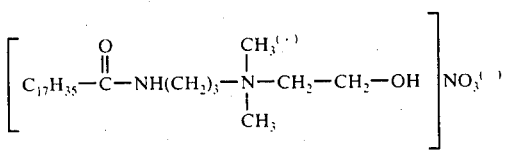

1.0 part of diglycerol monooleate.

EXAMPLE 6

85.5 parts of vinyl chloride homopolymer prepared by mass polymerization, K value 57,
10.0 parts of MABS resin as used in Example 1,
0.4 part of montanic acid ester as used in Example 1,
0.5 part of organic phosphite
1.5 parts of dibutyltin-bis (2-ethylhexyl-thioglycolate)
0.8 part of the compound of the formula

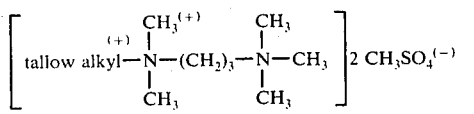

1.0 part of glycerol monooleate (commercial product available, for example under the name of Loxiol®G 10 of Messrs. Henkel-Chemie, Dusseldorf, or Barolub®LPL of Messrs. Chemische Werke Barlocher GmbH, Munich,
0.3 part of carbon black, were processed under the conditions of Example 1 to give a foil.

EXAMPLE 7

86.0 parts of a copolymer of vinyl chloride and butyl acrylate having a butyl acrylate content of 2.5% by weight, calculated on the copolymer, which copolymer had been prepared by suspension polymerization, K value 60,
9.5 parts of chlorinated low pressure polyethylene having a chlorine content of 39% by weight,
0.5 part of polymethylmethacrylate,
1.15 parts of di-n-octyltin bis(2-ethylhexyl-thioglycolate)
0.8 part of the compound of formula

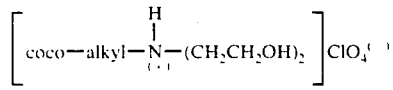

(coco-alkyl having the following typical chain distribution: $C_8:C_{10}:C_{14}:C_{16}:C_{18}$ in a proportion of 7 : 6 : 51 : 19 : 8 : 9 with 50 to 80% of $C_{18}$ being oleyl)
1.35 parts of glycerol monooleate,
0.3 part of carbon black
0.4 part of montanic acid ester with butanediol-1,3 as alcohol component,
were processed into a foil under the conditions of Example 1.

The physical properties of the foils prepared as described in Examples 1 to 7 are listed in the following table.

| Example | 1 | 2 | 3 | 4 | 5 | 6 | 7 | 8 |
|---|---|---|---|---|---|---|---|---|
| 1 | 120 μm | 44 | 15.5 | 41 | $10^9$ | 3064 | 0.1 | <0.01 |
| 2 | 120 μm | 38 | 19 | 45 | $10^9$ | 3074 | 0.05 | <0.01 |
| 3 | 160 μm | 48 | 13 | 38 | $10^9$ | 2955 | 0.15 | <0.01 |
| 4 | 200 μm | 48 | 4 | 26 | $10^9$ | 2726 | 0.2 | <0.01 |
| 5 | 100 μm | 52 | 12 | 31 | $10^{10}$ | 3051 | 0.1 | <0.01 |
| 6 | 120 μm | 55 | 17 | 31 | $10^9$ | 2805 | 0.1 | <0.01 |
| 7 | 120 μm | 51 | 19 | 25 | $10^{10}$ | 3021 | 0.05 | <0.01 | column 1: thickness
2: melt viscosity in g/10 minutes
3: reduction in length in %
4: toughness factor $Z_1$ in (% mm$^2$)/newtons
5: surface resistance in ohm
6: elastic modulus in newton/mm$^2$
7: Perth-O-Meter value in μm
8: extraction residue in % by weight

What is claimed is:

1. Rigid polyvinyl chloride foil free from plasticizer and having modified impact resistance, suitable for the manufacture of audio-visual information carriers with stamped in spiral grooves carrying the information reproducible by pressure scanning characterized by the following properties:
  a. a flow corresponding to a melt viscosity in the range of from 20 to 72 g/10 minutes,
  b. a reduction in length of at most 20 % at 160° C,
  c. a toughness corresponding to a factor of at least (25% . mm$^2$)/newtons in longitudinal and transverse directions d. a surface resistance of at most $10^{10}$ ohms,
e. an elasticity corresponding to an elastic modulus in the range of from 2,500 to 5,000 newtons/mm$^2$,
f. a peak-to-valley height corresponding to a Perth-O-Meter value of less than 0.4 µm, and
g. a surface deposit corresponding to a foil extraction residue of less than 0.012% by weight.

2. Rigid polyvinyl chloride foil as claimed in claim 1, having a flow corresponding to a melt viscosity in the range of from 35 to 55 g/10 minutes.

3. Rigid polyvinyl chloride foil as claimed in claim 1, having an elastic modulus in the range of from 2,700 to 3,200 newtons/mm$^2$.

* * * * *